(12) United States Patent
Chinomi et al.

(10) Patent No.: US 7,734,417 B2
(45) Date of Patent: Jun. 8, 2010

(54) IMAGE PROCESSING DEVICE AND METHOD FOR PARKING SUPPORT

(75) Inventors: Satoshi Chinomi, Yokohama (JP); Tatsumi Yanai, Chuo-ku (JP)

(73) Assignee: Nissan Motor., Ltd., Yokohama-shi, Kanagawa (JP)

( * ) Notice: Subject to any disclaimer, the term of this patent is extended or adjusted under 35 U.S.C. 154(b) by 1055 days.

(21) Appl. No.: 11/438,117

(22) Filed: May 19, 2006

(65) Prior Publication Data

US 2007/0003108 A1    Jan. 4, 2007

(30) Foreign Application Priority Data

May 20, 2005    (JP)    ............................. 2005-147990

(51) Int. Cl.
    *B60Q 1/48* (2006.01)
(52) U.S. Cl. ..................... 701/301; 340/932.2; 348/118
(58) Field of Classification Search .............. 340/932.2; 701/301; 348/118
    See application file for complete search history.

(56) References Cited

U.S. PATENT DOCUMENTS

| 6,636,258 | B2 * | 10/2003 | Strumolo ..................... 348/149 |
| 7,161,616 | B1 * | 1/2007 | Okamoto et al. ............ 348/148 |
| 7,256,688 | B2 * | 8/2007 | Mizusawa ................... 340/461 |
| 2002/0145663 | A1 * | 10/2002 | Mizusawa et al. ........... 348/118 |
| 2002/0149673 | A1 * | 10/2002 | Hirama et al. .............. 348/118 |
| 2003/0063774 | A1 | 4/2003 | Oizumi |
| 2003/0179293 | A1 | 9/2003 | Oizumi |
| 2004/0085447 | A1 * | 5/2004 | Katta et al. ................. 348/143 |

FOREIGN PATENT DOCUMENTS

| CN | 1460375 A | 12/2003 |
| EP | 0 949 818 A2 | 10/1999 |
| EP | 1 179 958 A1 | 2/2002 |
| EP | 1 304 264 A2 | 4/2003 |
| EP | 1 434 441 A1 | 6/2004 |
| JP | 2000-168475 | 6/2000 |
| JP | 2001-339716 | 12/2001 |
| JP | 2003-111074 | 4/2003 |
| JP | 2003-281505 | 10/2003 |
| JP | 2004-048621 | 2/2004 |
| JP | 2004-064441 | 2/2004 |
| JP | 2004-254219 | 9/2004 |

* cited by examiner

*Primary Examiner*—Thomas G Black
*Assistant Examiner*—Shelley Chen
(74) *Attorney, Agent, or Firm*—Young Basile

(57) ABSTRACT

An image processing device and method for parking support that allows the driver to perceive the state surrounding the vehicle correctly in a simple operation even if plural cameras are carried on the vehicle. Plural images are acquired using plural cameras for image pickup in different directions surrounding the vehicle. These images are used to show the state surrounding the vehicle to the driver, preferably in the form of a bird's-eye view. The view seen by the driver can switch from the bird's-eye view to an image of a desired view. This view can be selected by the driver by, for example, touching the screen upon which the bird's-eye view is displayed.

15 Claims, 6 Drawing Sheets

IMAGE PROCESSING DEVICE AND METHOD FOR PARKING SUPPORT

TECHNICAL FIELD

The present invention pertains to a type of image display device and image display method that displays an image for a driver to perceive the state surrounding a vehicle when, e.g., the vehicle is parked.

BACKGROUND

Driving supporting technology exists whereby cameras are set at plural sites on a vehicle body, and images taken by the cameras are displayed so that the driver can see in the directions that were formerly dead angles. As described in, for example, Japanese Kokai Patent Application No. 2000-168475, in this driving supporting technology, information desired by the driver is selected, and the selected information is displayed. The information corresponds to manipulation of a selecting switch by the driver. Also, by moving the gear shift of the vehicle to the R position, the image behind the vehicle is displayed so that the driver can see it.

BRIEF SUMMARY OF THE INVENTION

Accordingly, an image display device for a vehicle is provided. The image display device comprises plural cameras for capturing images in different directions surrounding the vehicle, an image processing device operable to use plural images acquired with the plural cameras to form a bird's eye view showing the entire view surrounding the vehicle, a display device operable to provide the bird's eye view to a driver of the vehicle, and at selector operable to allow selection of a desired view from the vehicle. The image processing device is further operable to switch from the bird's eye view to an image corresponding to the desired view when the desired view is selected by the selector.

Other aspects of the invention provide an image display device for a vehicle comprising image pickup means for taking plural images in plural different directions surrounding the vehicle, image processing means for forming a bird's eye view showing the entire view surrounding the vehicle using the plural images, display means for showing the bird's eye view, and switching means for switching from the bird's eye view to a view from one of the image pickup means. The view is selectable by the driver when the bird's eye view is displayed on the display means.

An image display method for a vehicle disclosed comprises capturing plural images surrounding the vehicle in plural different directions, forming a bird's eye view illustrating the entirety of the view surrounding the vehicle using the plural images, displaying the bird's eye view, selecting a desired view captured by the plural images, and switching from the bird's eye view to the desired view.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the aforementioned technology that displays necessary information by means of manipulation of a selecting switch, the number of cameras carried on the vehicle is increased. Consequently, the types of images that can be presented to the driver are increased, so that the number of selecting switches of images is larger. It is difficult for the driver to remember which selecting switch to use to display which image. Also, for a current driving scenario, it is difficult to judge which image to display among the many images such that the driver can perceive the state surrounding the vehicle to avoid undesired contact. The prior art thus results in an undesirable situation where it difficult to switch corresponding to the many images.

The present invention solves these and other problems of the prior art by providing an image display device and image display method that can correctly make the driver perceive the state surrounding the vehicle with a simple manipulation even if many cameras are carried on the vehicle and are used to take pictures for the state surrounding the vehicle.

Accordingly, plural images are taken by plural cameras set to take pictures in different directions around a vehicle and can be used to show the state surrounding the vehicle to the driver. More specifically, the plural images can be acquired and used to form a bird's-eye view illustrating the entirety of the view surrounding the vehicle. When a bird's-eye view is displayed, if a direction for the driver to perceive the state surrounding the vehicle is selected, switching can be performed from the bird's-eye view to the image including the state surrounding the vehicle in the selected direction with respect to the vehicle. Consequently, while the bird's-eye view is displayed and the state surrounding the vehicle and the portions of the vehicle are correlated with each other and presented to the driver, it is possible to select an image surrounding the vehicle. Thus, even if many cameras are carried on the vehicle and are used to take pictures for the state surrounding the vehicle, the state surrounding the vehicle can be perceived correctly with a simple operation, and it is possible to select an image surrounding the vehicle as needed without confusion.

These and other embodiments of the present invention are best explained in the following, which describes the embodiments with reference to the figures.

Figure 1:
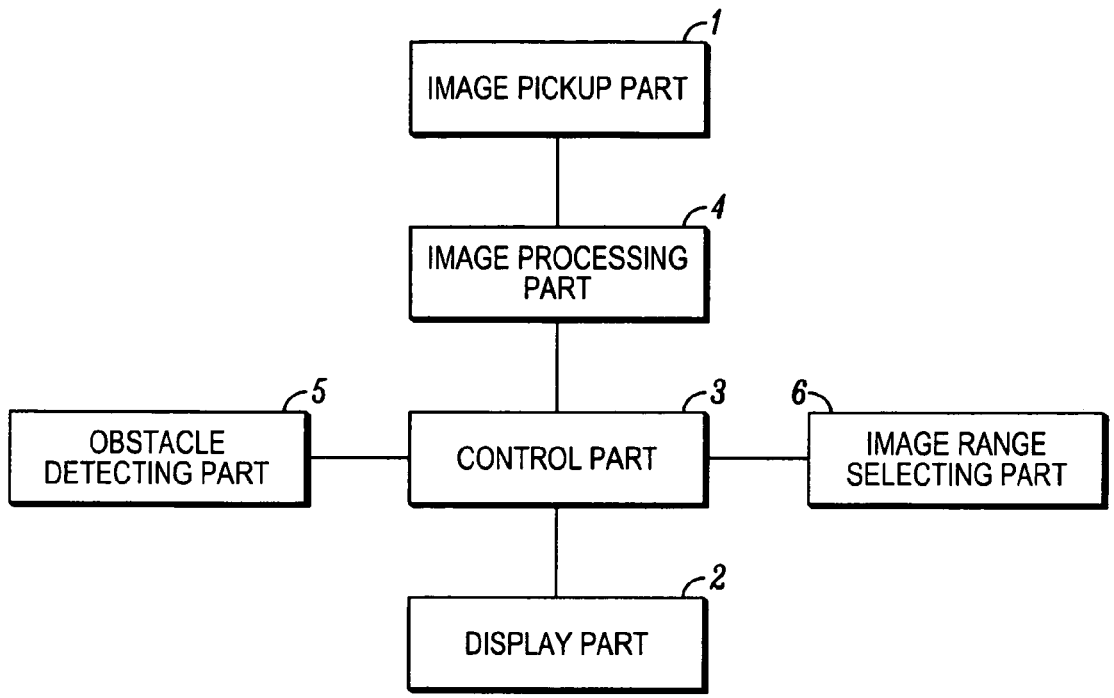
FIG. 1 is a block diagram illustrating one driving supporting device in which the present invention can be adopted.

The present invention can be adopted in the driving supporting device as shown in the block diagram of FIG. 1. This driving supporting device has a functionality of an image display device that displays various images illustrating the state surrounding the vehicle for the driver, and an image needed by the driver is displayed to support the driving operation.

As shown in FIG. 1, this driving supporting device has an image pickup part 1, preferably composed of plural cameras carried on a vehicle body, and a display part 2 set in the cabin of the vehicle itself at a position that allows the driver to watch the display picture. Image processing part 4, obstacle detecting part 5 and image range selecting part 6 are connected to control part 3, which performs overall control on the image display using the plural camera images taken by image pickup part 1. The control part 3 can be, for example, a standard microprocessor coupled to memory or a standard microcontroller incorporating on-board memory, where the memory stores a control program for controlling the image display as described below. Each of these parts is discussed in more detail below.

Figure 2:
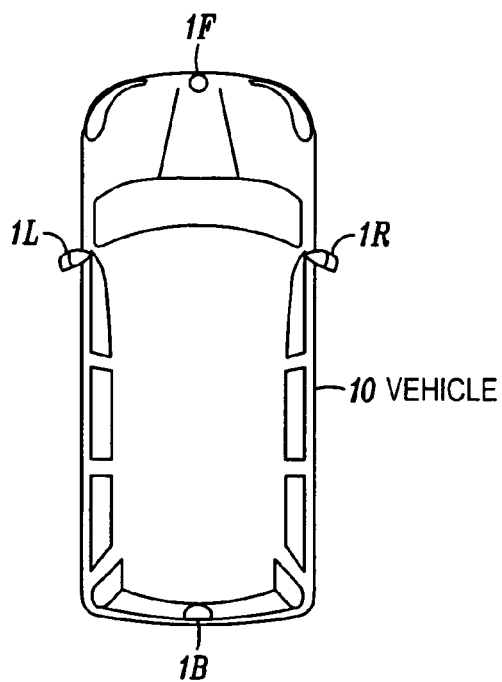
FIG. 2 is a top view illustrating an image pickup part that can be used in a driving supporting device.

As shown in FIG. 2, image pickup part 1 can be composed of four cameras, specifically front camera 1F set in the front portion of the vehicle 10, rear camera 1B set in the rear portion of the vehicle 10, right side camera 1R set on the right side door mirror of the vehicle 10 and left side camera 1L set on the left door mirror of the vehicle 10. Front camera 1F, rear camera 1B, right side camera 1R, and left side camera 1L are designed optically to cover an image angle of 180°, by example. By acquiring the front camera image, the rear camera image, the right side camera image and the left side camera image from the front camera 1F, rear camera 1B, right side camera 1R and left side camera 1L, respectively, the driving supporting device can acquire all of the images surrounding the vehicle 10.

Figure 3:
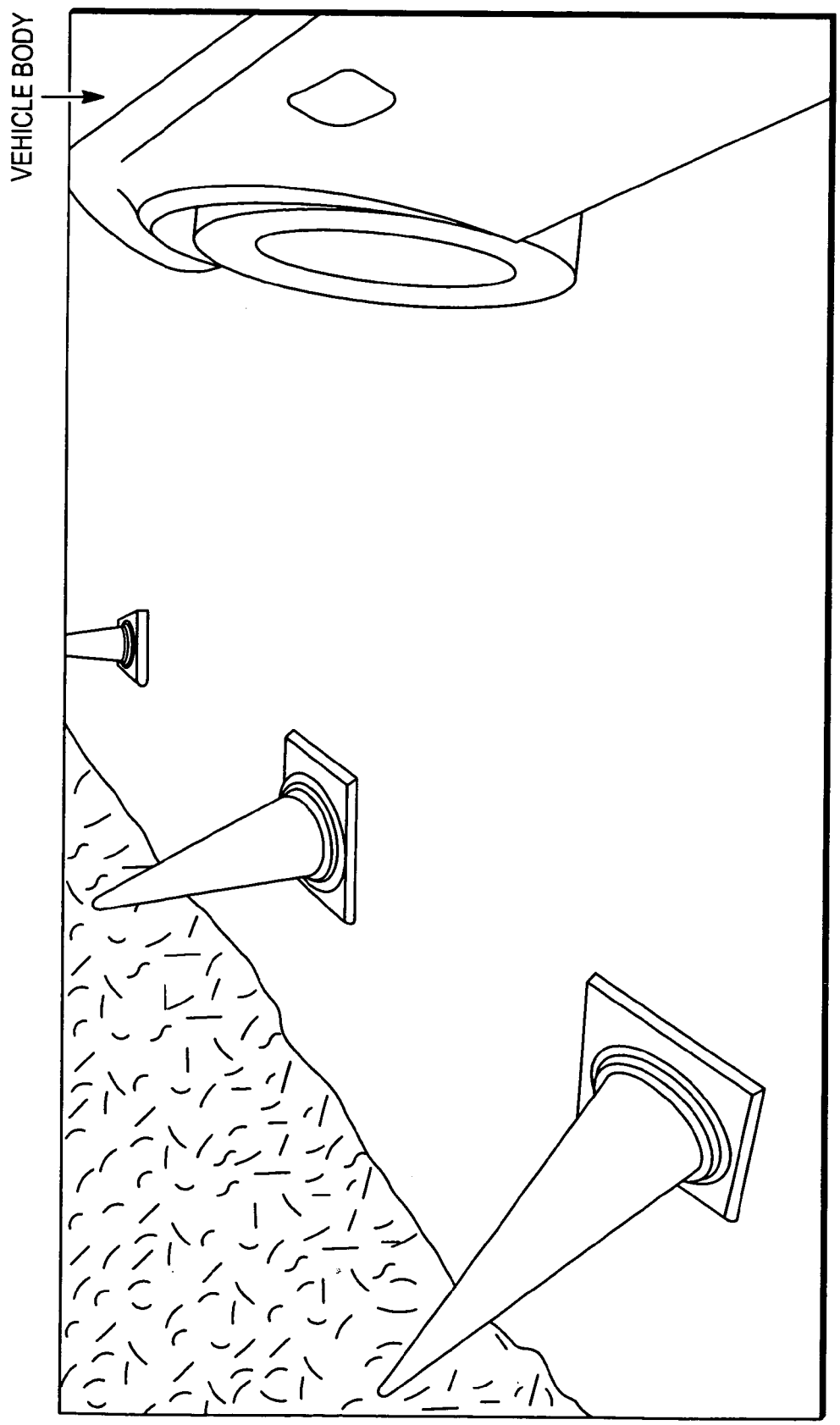
FIG. 3 is an example of an image picked up by the left side camera of a driving supporting device.
Figure 4:
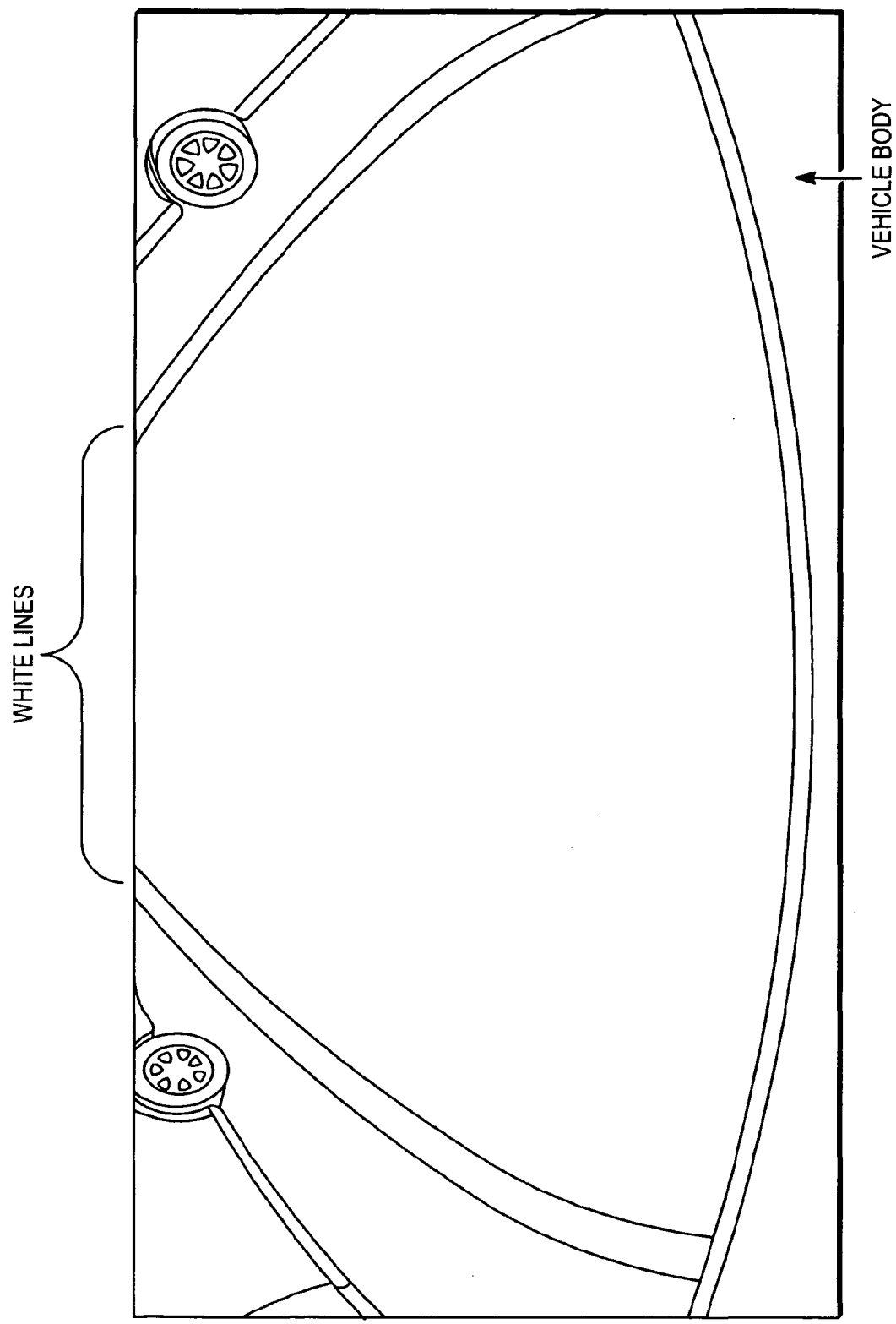
FIG. 4 is an example of an image taken by the rear side camera of a driving supporting device.

Here, as shown in FIG. 3, the left side camera image taken by left side camera 1L includes the left side vehicle body and the surroundings of the tire. As shown in FIG. 4, the rear side camera image taken by rear camera 1B includes the rear vehicle body, the white lines of the parking marking, and the neighboring vehicles parked on the sides. Front camera image, rear camera image, right side camera image and left side camera image are output to image processing part 4.

The image taken by image pickup part 1 and subjected to image processing for display is input to display part 2. Corresponding to the manipulation of the driver, the state of detection of obstacles with obstacle detecting part 5, etc., is displayed. The display part 20 can display the bird's-eye view showing the entirety surrounding the vehicle 10 or an image containing a portion of the view surrounding the vehicle 10.

The image processing part 4 acquires the plural camera images taken by image pickup part 1 and performs the prescribed image processing for them to form a bird's-eye view showing the entire view surrounding the vehicle. For additional details of the generation of a bird's-eye view, the reader is referred to U.S. patent application Ser. No. 11/366,091, filed Mar. 2, 2006, which is assigned to the current assignee and is incorporated herein in its entirety by reference. In brief, image processing part 4 pre-stores a transformation table that records the pixel configuration relationship between the input plural camera images and the output bird's-eye view. When the plural camera images from image pickup part 1 are input to image processing part 4, the various camera images are stored in a prescribed input memory. By means of image processing part 4, the stored camera images are read in pixel units according to the transformation table and are stored in an output memory. As a result, in the output memory, it is possible to develop a bird's-eye view formed by cutting necessary image regions from the front camera image, rear camera image, right side camera image and left side camera image. Then, after completion of the formation of the bird's-eye view according to the transformation table, image processing part 4 outputs the bird's-eye view to control part 3.

The bird's-eye view formed in image processing part 4 has a virtual viewpoint position from four camera images, that is, the image obtained by extracting the portion near the front tire from the left side camera image as shown in FIG. 3 and the image obtained by cutting at an angle of about 120° from the rear camera image as shown in FIG. 4, etc., merged to a point in the sky above the vehicle. Such a bird's-eye view allows the driver to perceive the view surrounding the vehicle as if the driver were looking down from the sky above the vehicle.

Figure 5:
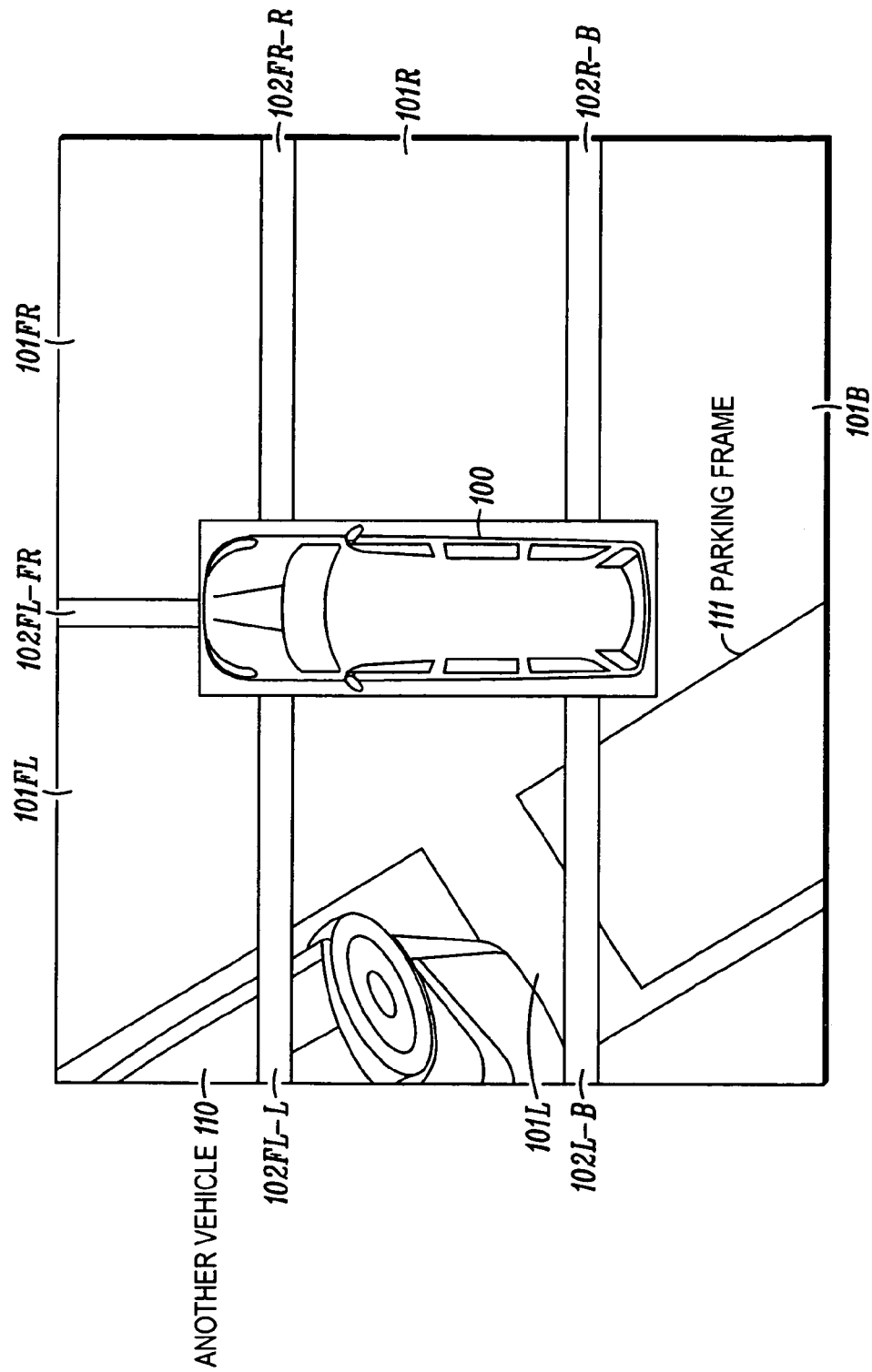
FIG. 5 is an example of a bird's-eye view displayed on the display portion of a driving supporting device.

For example, in the case of parallel parking when the vehicle backs in a leftward oblique direction as shown in FIG. 5, a bird's-eye view is formed by image processing part 4. As shown in FIG. 5, the vehicle's computer-generated image 100 is set at the center of the display image. In the periphery of the vehicle's computer-generated image 100, the following viewpoint transformed images are set: vehicle left-front image 101FL, vehicle right-front image 101FR, vehicle left side image 101L, vehicle right side image 101R and vehicle rear image 101B (collectively referred to hereinafter as "vehicle portion image 101"). Mask line 102FL-FR is set at the joining line between vehicle left-front image 101FL and vehicle right-front image 101FR. Mask line 102FL-L is set at the joining line between vehicle left-front image 101FL and vehicle left side image 101L. Mask line 102FR-R is set at the joining line between vehicle right-front image 101FR and vehicle right side image 101R. Mask line 102L-B is set at the joining line between vehicle left side image 101L and vehicle rear image 101B. Finally, mask line 102R-B is set at the joining line between vehicle right side image 101R and vehicle rear image 101B. When the mask lines are generally referred to, they are simply denoted as "mask line 102."

By setting mask line 102 at each joining line between adjacent images, the bird's-eye view is divided into plural regions, and the driver can perceive the overall view surrounding the vehicle. As far as the scheme for dividing the bird's-eye view is concerned, in addition to the pattern shown in FIG. 5, one may also divide it either finer, i.e., into more than five portions, or less fine, e.g., into three portions.

Obstacle detecting part 5 detects the presence or absence of an obstacle around the vehicle and the relative position of the obstacle, if any, with respect to the vehicle (i.e., direction and distance with respect to the vehicle 10). Examples of obstacle detecting part 5 include a type that uses an ultrasonic sensor or infrared (IR) sensor to detect obstacles, and a type that has the camera image taken by image pickup part 1 input to it and performs image analysis or the like to detect the obstacle. Obstacle detecting part 5 outputs the obstacle detection information, including the presence or absence of an obstacle with respect to the vehicle and the relative position, to control part 3.

Image range selecting part 6 is a selector that, together with the control part 3, selects the portion of the view surrounding the vehicle that the driver wishes to watch from the front view, left/right side views, and rear view of the vehicle. This image range selecting part 6 may have a touch-panel type touch coordinate detecting mechanism. Such mechanism can include one wherein electrodes are set in a matrix configuration in the display screen of display part 2. The electrodes correspond to the touching position with respect to the electrodes. The resistance value changes so that the display coordinates in the display screen of display part 2 are detected. In addition to this, or alternatively, a switch type may be adopted that has switches dedicated to the various portions surrounding the vehicle. Upon manipulation by the driver, image range selecting part 6 outputs the selected portion information, that is, the information of the portion surrounding the vehicle that the driver wishes to watch, to control part 3.

Control part 3 switches between the bird's-eye view and the portion of the view surrounding the vehicle selected with image range selecting part 6 for display on display part 2. The obstacle detection information indicating presence/absence and the relative position of the obstacle developed with obstacle detecting part 5 and the selected portion information from image range selecting part 6 are input to control part 3. Based on the obstacle detection information from obstacle detecting part 5, control part 3 judges the possibility of contact between the vehicle itself and the obstacle. In the judgment of the contact possibility with respect to the obstacle, if it is determined from the obstacle detection information that the obstacle is entering a prescribed range within the sensing range of a sensor, or that the obstacle is approaching the vehicle itself to within a prescribed distance, e.g., 1 m, it is judged that there is a possibility of contact with the obstacle.

Using this information, the following scheme may be adopted. Control part 3 detects from a change in the obstacle detection information whether the object is approaching the vehicle or is moving away from the vehicle, and, if an obstacle that is present in a prescribed range is approaching, it is judged that there is possibility of contact. Judgment of the possibility of contact may be performed by either control part 3 or obstacle detecting part 5. Then, from the possibility of contact of the object to the vehicle and the selected portion information, control part 3 controls to switch the image displayed on display part 2 between the bird's-eye view and the portion of the view surrounding the vehicle selected by image range selecting part 6.

In the following, an explanation will be given regarding image assigning treatment that changes the selected portion information generated in image range selecting part 6 under manipulation of the driver. In this explanation, a first image assigning treatment and a second image assigning treatment will be explained. However, the driving supporting device may perform any image switching treatment.

In the first image assigning treatment, while vehicle portion images 101 allotted to the portions surrounding the vehicle divided by mask lines 102 in the bird's-eye view as shown in FIG. 5 are displayed, selection of a specific vehicle portion image 101 is detected, and selected portion information is formed by image range selecting part 6. Here, if image range selecting part 6 is formed in a touch-panel type touch coordinate detecting mechanism, the touch coordinates are compared with each of the display ranges of vehicle left-front image 101FL, vehicle right-front image 101FR, vehicle left side image 101L, vehicle right side image 101R and vehicle rear image 101B, and judgment is made on a selected portion of the view surrounding the vehicle.

As a result, image range selecting part 6 can display the camera image corresponding to selected vehicle portion image 101 on display part 2.

Figure 6:
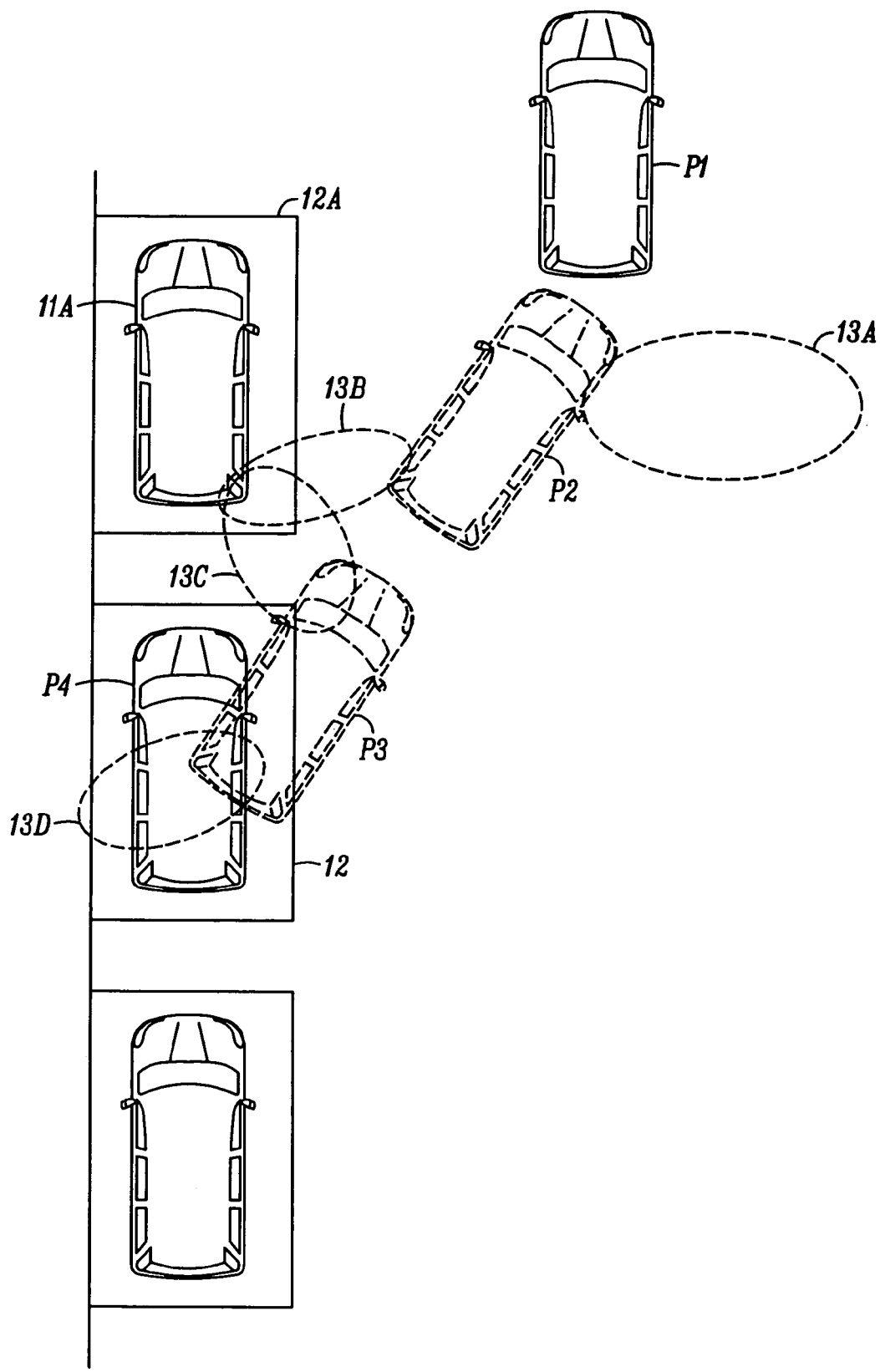
FIG. 6 is a diagram illustrating contactable regions that can be displayed by switching in a driving supporting device.
Figure 7:
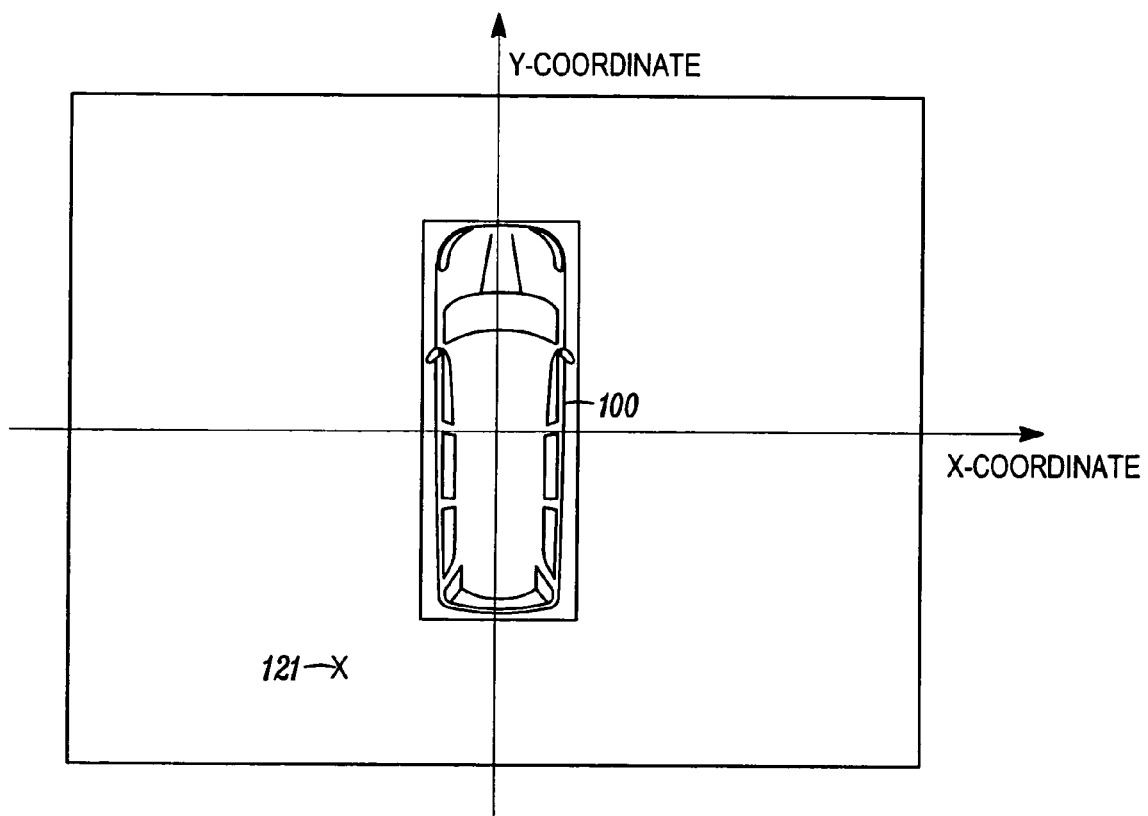
FIG. 7 is a diagram illustrating the treatment of selection of images by manipulation of the driver in a driving supporting device.

In the second image assigning treatment, by means of a touch-panel type touch coordinate detecting mechanism, the coordinates of the portion of the view surrounding the vehicle that the driver wishes to watch are read, and the selected portion information for displaying the image for best viewing of the portion near the relative position of the vehicle itself corresponding to the coordinates is formed. For example, as shown in FIG. 6, the driver is parallel parking to position P4 as the target within parking frame 12 from position P1 of the vehicle 10 via positions P2 and P3. At position P1, the driver touches the lower-left portion of the vehicle's computer-generated image 100 displayed on the screen as shown in FIG. 7. In this case, by means of the touch-panel type touch coordinate detecting mechanism of image range selecting part 6, coordinates (X, Y) of touch position 121 within the screen with respect to central coordinates (0, 0) of the vehicle's computer-generated image 100 are detected. The selected portion information that indicates the selection of the left rear side of the vehicle has occurred.

As a result, as shown in FIG. 6, an enlarged image around the direction from position P1 to parking frame 12 is cut out by control part 3 and displayed on display part 2. Also, as another example of second image assigning treatment, the bird's-eye view around coordinates (X, Y) in the image of touch position 121 is displayed.

In this way, as selected portion information is generated corresponding to assignment of a portion of the view surrounding the vehicle by image range selecting part 6, for example as shown in FIG. 6, the vehicle 10 moves from position P1 to position P2. As a site where the driver can touch, region 13B (contactable region) is recognized, and the state of the portion surrounding contactable region 13B is recognized. Touch position 121 is touched as shown in FIG. 7 on the display screen of display part 2. As a result, control part 3 can display an easily viewable image of the right rear side behind the vehicle on display part 2.

In the following, an explanation will be given regarding the image switching treatment displayed on display part 2 by means of the operation supporting device that can perform the image assigning treatment.

As an example, the image switching treatment can be explained with respect to the case shown in FIG. 6 in which the vehicle 10 is to be parallel parked from position P1 via positions P2 and P3 to position P4 as the target in parking frame 12. In this parallel parking operation, at position P2, there is contactable region 13A between the right-front portion of the vehicle 10 and another vehicle or wall surface (not shown in the figure) on the right side, and there is contactable region 13B between the left rear portion of the vehicle 10 and another vehicle 11A parked in parking frame 12A. Also, at position P3, there is contactable region 13C between the left-front portion of the vehicle 10 and the other vehicle 11A, and there is contactable region 13D between the left-rear portion of the vehicle 10 and the left side wall surface. A contactable region is a portion surrounding the vehicle where the driver of the vehicle 10 wishes to watch.

Here, when any site of the touch-panel type touch coordinate detecting mechanism of image range selecting part 6 is touched by the driver at position P1, control part 3 first displays the bird's-eye view shown in FIG. 5 formed by image processing part 4. As a result, as shown in FIG. 5, the bird's-eye view becomes an image including parking frame image 111 corresponding to parking frame 12, and another vehicle image 110 corresponding to another vehicle 11A parked in parking frame 12A. Also, when obstacle detecting part 5 detects another vehicle 11A as an obstacle present within several meters of the vehicle 10, control part 3 may display the bird's-eye view automatically on display part 2.

As a result, in the initial stage of the parallel parking operation, the driving supporting device can allow the driver to perceive the overall state of the view surrounding the vehicle 10 by means of the bird's-eye view.

Then, as the vehicle 10 backs from position P1 via position P2 to position P3, if it is judged that contact may take place in contactable region 13C and contactable region 13D, control part 3 can allow the driver to perceive the state between the vehicle 10 and another vehicle 11A or the side wall from the bird's-eye view. In this way, when the vehicle 10 is present at position P3, due to the judgment of the driver, in order to view another vehicle 11A present in contactable region 13C, the driver touches the portion corresponding to the left-front portion of the touch panel type touch coordinate detecting mechanism. As a result, control part 3 displays the front camera image or left side camera image taken by front camera 1F or left side camera 1L including the left-front portion, or a synthesized image of the front camera image and the left-front camera image on display part 2. As a result, the object displayed on display part 2 is switched from the bird's-eye view to an enlarged image of the portion surrounding the vehicle assigned by image range selecting part 6.

Also, the following scheme may be adopted. When it is judged from the obstacle detection information by obstacle detecting part 5 that the distance between the vehicle 10 and another vehicle 11A is only about 1 m and that there is a high possibility of contact between them, control part 3 automatically switches from the bird's-eye view to an enlarged image of the left side view of the vehicle 10.

Then, when it is judged by control part 3 that there is no possibility of contact in contactable region 13C from the obstacle detecting information detected with obstacle detecting part 5, control part 3 re-switches from the enlarged image of the left-front portion to the bird's-eye view for display on display part 2. As a result, the driver is notified that there is no need to check possible contact in contactable region 13C. Control part 3 can then check the overall state of the view surrounding the vehicle including checking of contact in the other contactable regions.

On the other hand, when the image of contactable region 13C is displayed, if it is judged that contact might still take place in contactable region 13C, while it is judged by obstacle detecting part 5 from the obstacle detecting information that contact may also take place in contactable region 13D, control part 3 switches the display on display part 2 to the bird's-eye view and indicates that two sites of contactable regions exist, that is, contactable region 13C and contactable region 13D. As a result, the driving supporting device can allow the driver to perceive the possibility of contact at two sites while maneuvering the vehicle.

When the driver is allowed to perceive two contactable regions, that is, contactable region 13C and contactable region 13D, control part 3 flickers contactable region 13C and contactable region 13D in the bird's-eye view, or changes their color, or flickers the boundary lines surrounding these contactable regions 13C, 13D as a display control treatment. As another option, based on the obstacle detecting information, as the distance from the vehicle 10 to the obstacle becomes smaller or the approaching speed becomes higher, the flickering of the contactable regions such as 13C and 13D accelerates, or the color is highlighted so that the driver's attention is aroused to notice contactable regions worth the most attention among the plural contactable regions 13A-13D.

As explained in detail above, for a driving supporting device adopting the present invention, plural camera images are acquired, and the acquired plural camera images are used to form a bird's-eye view that shows the entire view surrounding the vehicle. When the bird's-eye view is displayed, the driver can perceive the state surrounding the vehicle, and, when the driver selects a certain direction with respect to the vehicle, the displayed image is switched from the bird's-eye view to an image including the state of the portion of the view around the vehicle in the selected direction with respect to the vehicle. As a result, while the bird's-eye view is displayed, the driver can select any direction of viewing surrounding the vehicle based on notification to the driver of states surrounding the vehicle that correspond to the portions of the vehicle. Consequently, with this driving supporting device, even if images surrounding the vehicle taken by plural cameras are selected by the driver, the driver is still not confused in selecting images surrounding the vehicle as desired.

Also, with this driving supporting device, any obstacle approaching the vehicle can be detected. When it is judged that contact may take place between the vehicle and an obstacle, because the bird's-eye view is displayed, the driver can immediately select the desired image corresponding to the obstacle that may contact the vehicle.

In addition, for the aforementioned driving supporting device, when a direction with respect to the vehicle is selected and the display is switched to the image including the state of the portion surrounding the vehicle in the desired direction with respect to the vehicle, if it is detected that there is no obstacle approaching the vehicle in that direction and there is no danger of contact of the obstacle with the vehicle, the display is reset to the bird's-eye view. Consequently, the driver can perceive that there is no danger of contact in this direction, while the driver can immediately select the next image that requires attention.

In addition, with this driving supporting device, when a direction with respect to the vehicle is selected, and the display is switched to the image including the state of the portion of the view surrounding the vehicle in the direction with respect to the vehicle, if an obstacle approaching the vehicle is detected in a direction other than the direction with respect to the vehicle itself, and it is judged that the obstacle might contact the vehicle, the display is switched back to the bird's-eye view. Consequently, when a contactable site is displayed, it is possible for the driver to perceive other possible contacts with obstacles.

For this driving supporting device it is possible to display the danger of contact with an obstacle in a selected direction with respect to the vehicle and the danger of contact in a direction other than the selected direction with respect to the vehicle on the bird's-eye view, so the driver can perceive locations of danger of contact surrounding the vehicle in the current state.

This application is based on Japanese Patent Application No. 2005-147990, filed May 20, 2005, in the Japanese Patent Office, the entire contents of which are hereby incorporated by reference.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An image display device for a vehicle, comprising:
plural cameras for capturing images in different directions surrounding the vehicle;
an image processing device operable to use plural images acquired with the plural cameras to form a bird's-eye view showing the entire view surrounding the vehicle;
a display device operable to provide the bird's-eye view to a driver of the vehicle;
a selector operable to allow selection of a desired view from the vehicle; wherein the image processing device is operable to switch from the bird's-eye view to an image corresponding to the desired view when the desired view is selected by the selector; and
an obstacle detector operable to generate a signal indicative of an obstacle approaching the vehicle;
wherein the image processing device is operable to switch to the bird's-eye view from the image corresponding to the desired view when the obstacle detector indicates a first obstacle approaching the vehicle;
wherein the image processing device is operable to switch from the bird's-eye view to an obstacle image in a direction of the first obstacle in response to indication of the first obstacle by the obstacle detector; and wherein the image processing device is operable to switch from the obstacle image in the direction of the first obstacle to the bird's-eye view in response to indication of a second obstacle by the obstacle detector.

2. The image display device according to claim 1 wherein the selector is operable by the driver to select the desired view the driver wishes to watch while the bird's-eye view is displayed.

3. The image display device according to claim 1, wherein the image processing device is operable to switch to the bird's-eye view from the image corresponding to the desired view when the obstacle detector indicates a first obstacle approaching the vehicle while the image corresponding to the desired view is displayed.

4. The image display device according to claim 1, further comprising:
a visible indicator for indicating a presence of the first obstacle and a presence of the second obstacle in the bird's-eye view.

5. The image display device according to claim 3, further comprising:
a visible indicator for indicating a presence of the first obstacle and a presence of a second obstacle in the bird's-eye view when the obstacle detector indicates the second obstacle approaching the vehicle.

6. The image display device according to claim 3 wherein the display device comprises a touch-panel type touch coordinate detecting mechanism; and wherein the selector further comprises a screen of the touch-panel type touch coordinate detecting mechanism, the screen operable for manipulation using contact by the driver.

7. The image display device according to claim 1 wherein the display device comprises a touch-panel type touch coordinate detecting mechanism; and wherein the selector further comprises a screen of the touch-panel type touch coordinate detecting mechanism, the screen operable for manipulation using contact by the driver.

8. The image display device according to claim 7, further comprising:
plural regions dividing the bird's-eye view provided on the display device; and wherein the display device is further operable to display the image corresponding to the desired view in a region corresponding to desired view.

9. An image display device for a vehicle, comprising:
image pickup means for taking plural images in plural different directions surrounding the vehicle;
image processing means for forming a bird's-eye view showing the entire view surrounding the vehicle using the plural images;
display means for showing the bird's-eye view;
switching means for switching from the bird's-eye view to a view from one of the image pickup means, the view selectable by the driver when the bird's-eye view is displayed on the display means, means for detecting an obstacle approaching the vehicle;
means for switching from the bird's-eye view to an obstacle image in a direction of the first obstacle in response to indication of the first obstacle by the obstacle detector; and
means for switching from the obstacle image in the direction of the first obstacle to the bird's-eye view in response to indication of a second obstacle by the obstacle detector.

10. The image display device according to claim 9, further comprising:
means for switching to the bird's-eye view from the view from one of the image pickup means when the obstacle first approaching the vehicle is detected and the view from one of the image pickup means is displayed on the display means.

11. The image display device according to claim 9, further comprising:
means for dividing the bird's-eye view shown on the display means into plural regions surrounding the vehicle; and wherein the display means displays the view as an image in one of the plural regions in a direction corresponding to the view.

12. An image display method for a vehicle, comprising:
capturing plural images surrounding the vehicle in plural different directions;
forming a bird's-eye view illustrating the entirety of the view surrounding the vehicle using the plural images;
displaying the bird's-eye view;
selecting a desired view captured by the plural images;
switching from the bird's-eye view to the desired view,
detecting a first obstacle approaching the vehicle;
switching to the bird's-eye view from the desired view when the first obstacle approaching the vehicle is detected and the desired view is displayed;
switching to an obstacle image in a direction of the first obstacle when the obstacle approaching the vehicle continues to be detected; and
switching from the obstacle image in the direction of the first obstacle to the bird's-eye view in response to detecting a second obstacle approaching the vehicle.

13. The image display method according to claim 12, further comprising:
indicating, in the bird's-eye view, a presence of the first obstacle and a presence of the second obstacle approaching the vehicle.

14. The image display method according to claim 12, further comprising:
selecting the desired view using a screen displaying the bird's-eye view.

15. The image display method according to claim 14, further comprising:
dividing the bird's-eye view into plural regions surrounding the vehicle; and
displaying the desired view as an image in one of the plural regions in a direction corresponding to the desired view.

* * * * *